United States Patent [19]

Kim et al.

[11] Patent Number: 5,117,856

[45] Date of Patent: Jun. 2, 1992

[54] FLOW RANGE EXTENDING VALVE

[75] Inventors: Raymond K. Kim, Canton; Larry Jeffers, Alliance, both of Ohio

[73] Assignee: The Babcock & Wilcox Company, New Orleans, La.

[21] Appl. No.: 762,279

[22] Filed: Sep. 19, 1991

[51] Int. Cl.⁵ .............................................. G05D 7/00
[52] U.S. Cl. ..................... 137/110; 73/197; 137/119; 251/65
[58] Field of Search ................. 137/110, 119; 73/197; 251/65

[56] References Cited

U.S. PATENT DOCUMENTS

| 966,316 | 8/1910 | Dilts | 73/197 |
| 1,103,655 | 7/1914 | Calhoun | 73/197 |
| 2,821,085 | 1/1958 | Gehre | 73/197 |

Primary Examiner—Robert G. Nilson
Attorney, Agent, or Firm—Vytas R. Matas; Robert J. Edwards; Daniel S. Kalka

[57] ABSTRACT

A valve arrangement for use in measuring a wide range of gas flow rates, comprises a valve housing including one inlet for a gas flow and two outlets, one for a low flow rate and the other for high flow rate. A plug is vertically moveable in the housing and includes a large diameter lower end engageable against a seat for closing a large port in the housing, and a small diameter upper end for engagement against an upper small diameter seat in the housing. The large and small seats communicate with the high and low flow rate outlets. Ferromagnetic material forms at least part of each seat with the plug being magnetic for retaining either its upper or lower position depending on the inlet flow rate. With a high inlet flow rate, the plug is lifted from its lower seat to close its low flow rate outlet and open its high flow rate inlet. At low flow rate, gravity causes the plug to drop. This permits the passage of the low flow rate gas through the low flow rate outlet. A diaphragm connected between the plug and the housing separates the outlets from each other. A small or low flow rate flowmeter is connected to the low flow rate outlet for measuring the low flowrate range and a large or high flow rate flowmeter is connected to the high flow rate outlet for measuring the high flow rate range. Thus a broad range of gas flow rates can be measured.

18 Claims, 2 Drawing Sheets

FLOW RANGE EXTENDING VALVE

FIELD AND BACKGROUND OF THE INVENTION

The present invention relates in general to valves, and in particular to a new and useful gas valve which is capable of extensively expanding the measurable range of a gas flow, by utilizing two flowmeters.

Insofar as their ability to expand measurable flow ranges by using combinations of two flowmeters and a valve, U.S. Pat. Nos. 3,677,084; 4,100,800; and 4,429,571, are examples of the prior art. These references, however are all directed to liquid flow measurements and contained a small flowmeter and a large flowmeter as part of the flowmeter packages. None of these patents describe an approach that could operate with a gas over the flow range of interest in the present invention.

Most flowmeters available commercially today operate within the maximum to minimum turn-down flow ratio of 40:1. However, a need for flowmeters with an extended operating flow range of 800:1 has been expressed, for example, by the Gas Research Institute (GRI). The gas flowmeters with extended flow range sought by GRI for residential distribution meters are expected to meet the following three specific performance requirements.

1. Turn-down ratio—about 800:1;
2. Measurement accuracy—better than $\pm 1\%$;
3. Pressure drop—less than 1.0 inch of water at the maximum flow.

There are a number of commercially-available flowmeters that can meet the accuracy requirement, but no existing flowmeter or flowmeters under development currently meet all three requirements. The present invention was conceived as a means to satisfy all three requirements.

SUMMARY OF THE INVENTION

An object of the present invention is to provide a valve arrangement which is capable of automatically and accurately measuring a wide maximum to minimum flow rate range of up to 800:1, while causing a pressure drop of less than 1.0 inches of water.

Another object of the present invention is to provide such a broad and accurate measurement of flow rate by utilizing a valve arrangement which redirects the gas flow from one to the other of two flowmeters, one being a flowmeter designed for high flow rates and the other being a flowmeter designed for relatively low flow rates.

Accordingly, the present invention comprises a valve arrangement which automatically switches an incoming gas flow between two outlet flow passages at a known transition flow rate. The flow switching valve of the invention is intended for use with two flowmeters so that a substantially wider range of flows can be measured by the combination than would be possible with any one flowmeter. The valve arrangement can be used in conjunction with any type of flowmeter.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
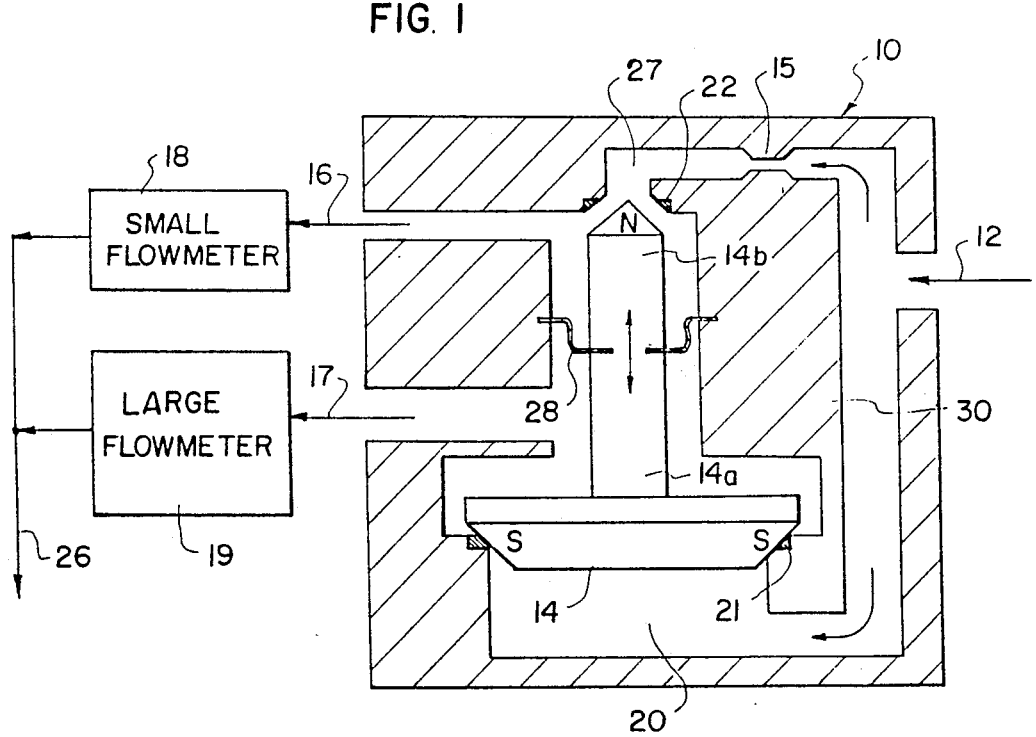
FIG. 1 is a schematic cross-sectional view of the valve arrangement according to the present invention connected to a small and a large flowmeter.

Referring to FIG. 1, the present invention comprises a valve generally designated 10 that automatically directs the incoming gas flow 12 either to a small flowmeter 18 or the large flowmeter 19 connected to it, at a preset transition flow rate. The flow range extending valve 10 of the invention shown in FIG. 1 is a gravity-assisted, magnetically-sealed, bi-stable, flow-switching valve. The essential elements of the valve are a valve housing 30 defining flow inlet 12, a flow-directing plug 14 movable in the housing, a flow restrictor 15, a small port 27, large port 20, and outlets 16 and 17 to the flowmeters. The plug 14 is made of permanent magnetic material, and valve seats 21 and 22 are made of ferro-magnetic material. The normal position of the flow directing plug 14 is dictated by the weight of the plug when the flow is less than the preset transition flow rate, permitting all incoming gas to flow through the small port 27 only. The plug is normally seated at the bottom at seat 21 at all times unless the flow exceeds the preset transition flow rate. An inlet gas flow beyond the preset flow rate induces a differential pressure across the bottom end 14a of the plug sufficient to lift the plug from its normal position, opening the large port 20 and closing the small port 27, thus passing the incoming flow 12 to the large flowmeter 19. For flows above the transition flow rate, the plug 14 is kept in its off-normal position by the drag force induced around the bottom of the plug and the magnetic attractive force at the top end 14b of the plug.

If the flow decreases below the transition flow rate, the plug 14 returns to its normal position, redirecting the incoming flow to the small port 27. The flow restrictor 15 will facilitate the movement of the plug 14 from the normal to the off-normal position. Use of a permanent magnet for the flow-directing plug 14 and ferromagnetic material for the valve seats 21 and 22 is intended to promote leak-tight seals against minor vibrations in the gas-carrying pipes.

Plug 14 also has a partially conical form to the large area end 14a and to the small area end 14b.

The flow path from the large port 20 to the outlet 17 and then to the large flowmeter 19 is arranged so as to add vertical, upward drag force to the plug sufficient to keep the large port open for the flow above the transition flow rate. Outlet flows from meters 18 and 19 merge to one outlet 26. The low flowrate outlet 16 is isolated from the high flowrate outlet 17 by a diaphragm 28 extending between the magnetic plug 14 and the walls of the valve housing 30, between the outlets.

Designing a flowmeter that covers the 800:1 flow range with $\pm 1\%$ measurement accuracy and with a pressure drop less than 1 inch of water is considered to be an extremely difficult task. The reasons for the difficultly lie in the inherently conflicting performance requirements:

1. A large-capacity flowmeter needs to have a large flow passage to keep the pressure drop low at the maximum flow rate, but the large flow passage makes the flowmeter insensitive to measure small flow rates.
2. A flowmeter with sufficient sensitivity at the minimum flow is normally required to have small flow passages, which cause high pressure drops at higher flow rates.
3. These inherent design conflicts are extremely exasperated when a flowmeter is required to cover a very wide flow range such as 800:1.

The flow range extending valve of the invention resolves these conflicts by combining a small flowmeter and a large flowmeter to cover the wide flow range without sacrificing the inherent measurement accuracies of the respective flowmeters and without exceeding the maximum pressure drop requirement.

Figure 2:
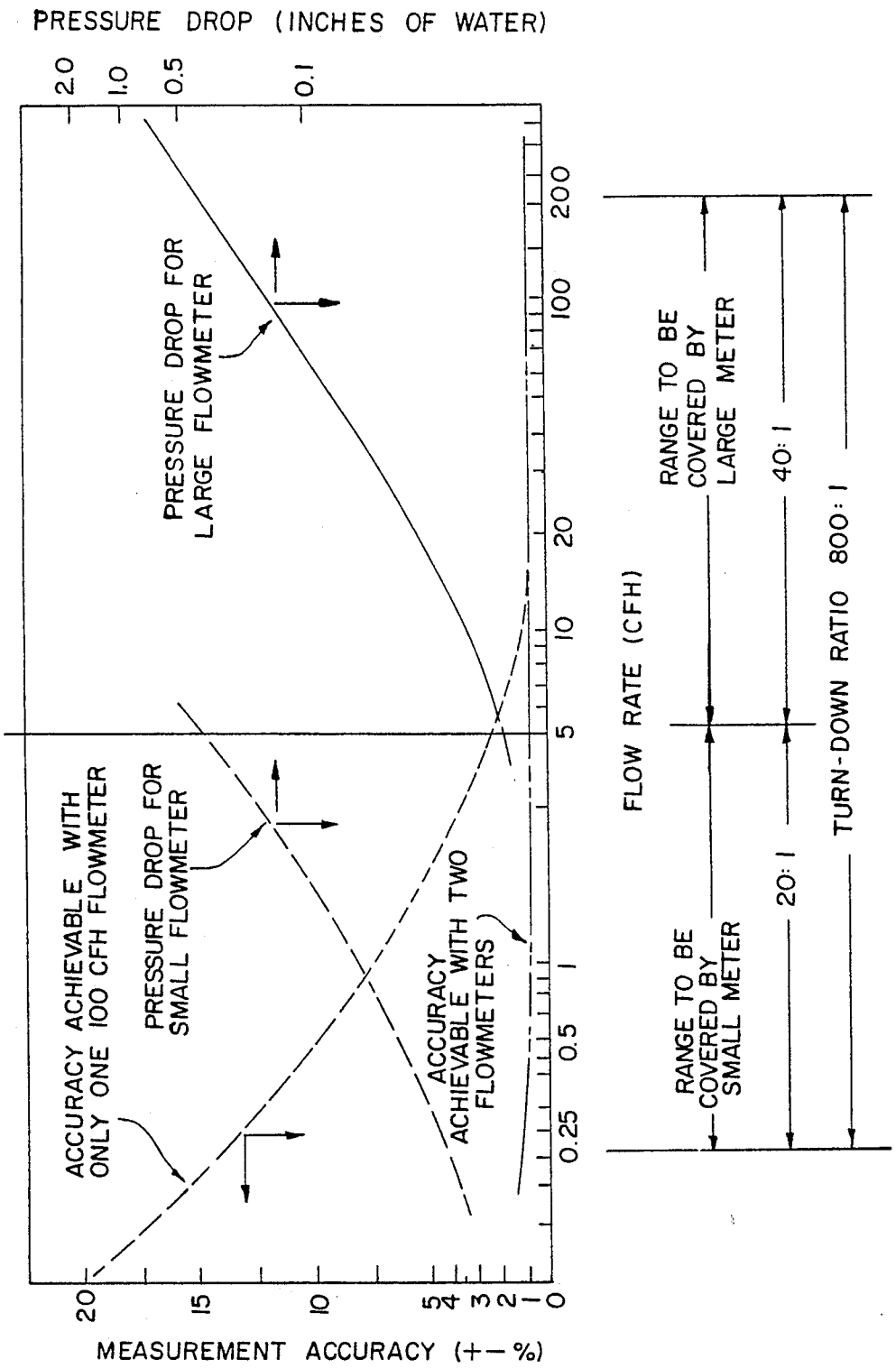
FIG. 2 is a graph plotting accuracy and pressure against flow rate for the present invention.

The function of the flow range extending valve is explained graphically in FIG. 2. FIG. 2 shows that flows less than the nominal transition flow rate of 5 cubic feet per hour (CFH) are measured with the smaller flowmeter, and the larger flowmeter handles the higher flows between 5 and 200 CFH. The graph also shows that the maximum pressure drop can be kept below 1 inch of water by directing the flow through the larger flowmeter. The actual transition flow rate may be somewhat more or less than the nominal transition flow rate, depending on whether the flow is increasing or decreasing when the flow-directing plug is actuated. Therefore, the two flowmeters may be required to have an overlapping flow range near the nominal transition flow rate.

The flow range extending valve of the invention makes it possible to assemble flow-measuring systems that can cover gas flow ranges much beyond that which has been conventionally possible with any one flowmeter. The valve can do this with a number of existing flowmetering technologies without compromising their inherent performance characteristics, such as measurement accuracy, linearity, pressure drop, etc. The valve does this passively and automatically without requiring any external source of power or human intervention. The valve works as a "transparent" element of the metering system. That is, users of the system need not know of the existence or operation of the valve to make flow measurements. The paired flowmeters in a system are not required to be of the same type.

The flow and pressure forces required to actuate the flow-switching valves are quite different for gas and for liquid flows. Consequently, a valve well designed for liquid flow will not work for gas. The present invention is intended for use at extremely low flows of gas.

Alternatives to the flow range extending valve are to develop a flowmeter that can satisfactorily handle an 800:1 turn-down ratio, which is presently considered to be extremely difficult. On the other hand, there can be other valve designs that would accomplish the same objectives; a spring-loaded diaphragm, for example.

The valve arrangement of the present invention takes advantage of the attractive magnetic force which drops off as the cube of the distance between the magnetic elements. This magnetic property helps the tightness of the closed ports and also makes it easier to move the plug with small flow forces once the plug is lifted. In addition, size, geometry and weight of the plug effect the operating characteristics of the invention. On the other hand, the pressure force required to lift the flow directing plug against the magnetic field, and the drag force needed to keep it up, are functions of the shape and size of the plug and the geometry of the flow passages. The partly conical large and small portions of the plug which seat against the conical seats, have been found to be advantageous in this regard.

While a specific embodiment of the invention has been shown and described in detail to illustrate the application of the principles of the invention, it will be understood that the invention may be embodied otherwise without departing from such principles.

What is claimed is:

1. A valve arrangement for extending the range of gas flow measurements, comprising:

a valve housing defining a gas flow inlet for receiving a flow of gas into the housing at a low flow rate range below a transition flow rate, and at a high flow rate range above the transition flow rate, the housing defining a relatively small port communicating with the inlet and a relatively large port spaced from the small port and also communicating with the inlet;

a relatively small area valve seat connected to said housing and extending around said small port;

a relatively large area valve seat connected to said housing and extending around said large port;

a plug mounted for movement in said housing, said plug having a relatively small area end engageable against said small port with said plug in a first position to close said small port, said plug including a relatively large area end spaced from said small area end and engageable against said large port with said plug in a second position to close said large port;

said housing including a low flow rate outlet communicating with said small port when the plug is in its second position for receiving gas flow at the relatively low flow rate range, said low flow rate outlet being adapted for connection to a small flow rate flowmeter for measuring the flow of gas through said low flow rate outlet, said housing including a high flow rate outlet communicating with said large port when the plug is in its first position, for receiving a gas flow in the high flow rate range, said high flow rate outlet being adapted for connection to a large flowmeter for measuring flow rates in the high flow rate range; and biasing means for biasing the plug into the second position when a gas flow in the low flow rate range enters the gas flow inlet, and for biasing the plug into its first position when a gas flow in the high flow rate range enters the gas flow inlet.

2. An arrangement according to claim 1 wherein the biasing means comprises each of the small and large area valve seats being made of ferromagnetic material and the plug being made of ferromagnetic material, at least one of the ferromagnetic materials being magnetized.

3. An arrangement according to claim 2 wherein each of the valve seats is a non-magnetized ferromagnetic material and the plug comprises a permanent magnet.

4. An arrangement according to claim 2 wherein the plug moves vertically in the housing between its first and second position, the large area end of the plug extending downwardly and the small area end of the plug extending upwardly, the force of the magnetized one of the seats and plug being selected to lift the plug from the large area seat when gas flow at and above the transition flow rate enters the gas flow inlet.

5. An arrangement according to claim 1 including a diaphragm connected between the plug at a location between its ends, and the housing for separating the high and low flow rate outlets from each other.

6. An arrangement according to claim 5 including in combination, a small flowmeter connected to the low flow rate outlet and a large flowmeter connected to the high flow rate outlet.

7. An apparatus according to claim 1 including a flow restrictor in the valve housing between the gas flow inlet and the small port.

8. An arrangement according to claim 7 wherein the biasing means comprises each of the small and large area valve seats being made of ferromagnetic material and the plug being made of ferromagnetic material, at least one of the ferromagnetic materials being magnetized.

9. An arrangement according to claim 8 wherein each of the valve seats is a non-magnetized ferromagnetic material and the plug comprises a permanent magnet.

10. An arrangement according to claim 9 wherein the plug moves vertically in the housing between its first and second position, the large area end of the plug extending downwardly and the small area end of the plug extending upwardly, the force of the magnetized one of the seats and plug being selected to lift the plug from the large area seat when gas flow at the transition flow rate enters the gas flow inlet.

11. An arrangement according to claim 10 including a diaphragm connected between the plug at a location between its ends, and the housing for separating the high and low flow rate outlets from each other.

12. An arrangement according to claim 11 including in combination, a small flowmeter connected to the low flow rate outlet and a large flowmeter connected to the high flow rate outlet.

13. An arrangement according to claim 1 wherein the transition flow rate is about 5 cubic feet per hour, the high flow rate range being above 5 cubic feet per hour and up to about 200 cubic feet per hour, and the low flow rate range being from 0 to about 5 cubic feet per hour.

14. An arrangement according to claim 1 wherein each of the large and small area ends of the plug are at least partly conical.

15. An arrangement according to claim 14 wherein each of the large and small area seats are at least partly conical.

16. An arrangement according to claim 15 wherein the biasing means comprises each of the small and large area valve seats being made of ferromagnetic material and the plug being made of ferromagnetic material, at least one of the ferromagnetic materials being magnetized.

17. An arrangement according to claim 16 wherein each of the valve seats is a non-magnetized ferromagnetic material and the plug comprises a permanent magnet.

18. An arrangement according to claim 17 wherein the plug moves vertically in the housing between its first and second position, the large area end of the plug extending downwardly and the small area end of the plug extending upwardly, the force of the magnetized one of the seats and plug being selected to lift the plug from the large area seat when gas flow at the transition flow rate enters the gas flow inlet.

* * * * *